Aug. 2, 1927.
W. A. ISBELL ET AL
1,637,572
METHOD OF MAKING SHEARS
Filed April 5, 1926
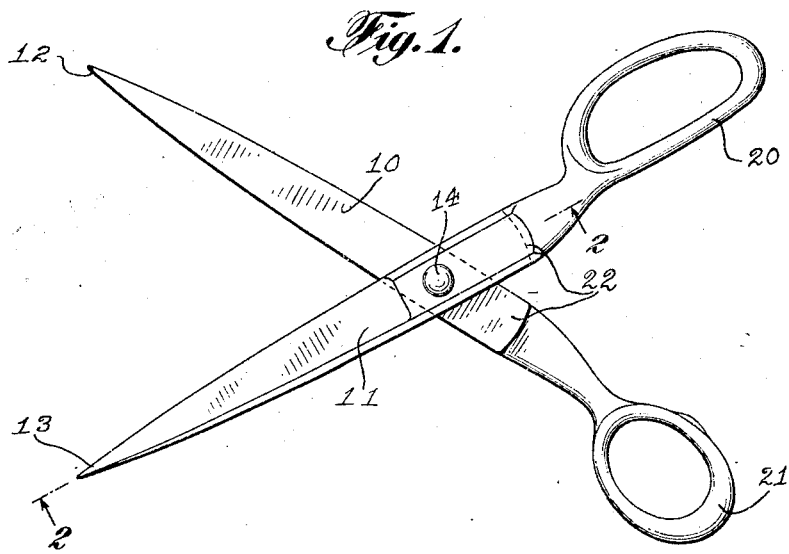
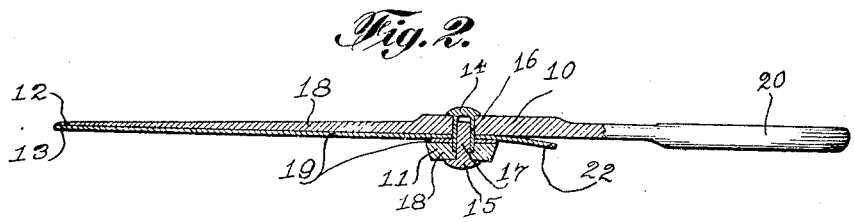
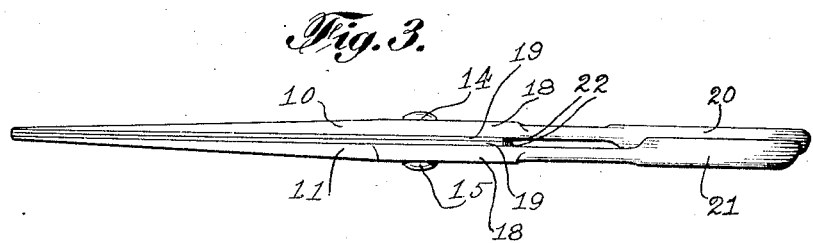
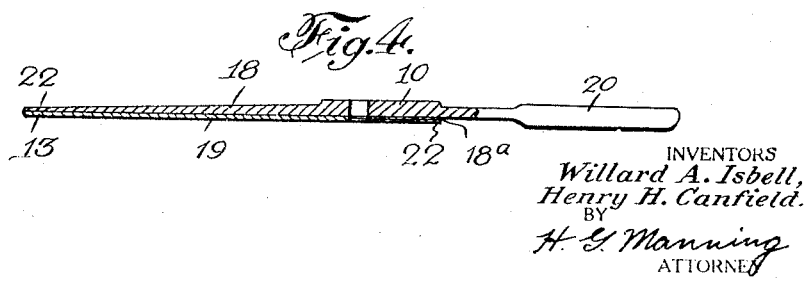
INVENTORS
Willard A. Isbell,
Henry H. Canfield.
BY
H. G. Manning
ATTORNEY Patented Aug. 2, 1927.

1,637,572

UNITED STATES PATENT OFFICE.

WILLARD A. ISBELL AND HENRY H. CANFIELD, OF WOODBURY, CONNECTICUT.

METHOD OF MAKING SHEARS.

Application filed April 5, 1926. Serial No. 99,771.

This invention relates to shears and scissors, and more particularly to improvements in that type of shears in which the cutting members are reinforced by hardened steel strips welded to the inner surfaces thereof.

One object of the invention is to provide shears of the above nature in which the hardened steel strips have integral curved sections extending beyond the pivot point for pressing together the cutting edges of the shear members.

A further object is to provide a device of this nature which will be simple in construction, inexpensive to manufacture, easy to install and manipulate, which will not require adjustment, ornamental in appearance, and very efficient and durable in use.

With these and other objects in view, there has been illustrated on the accompanying drawings, one form in which the invention may be conveniently embodied in use.

Fig. 1 represents a plan view of a pair of shears constructed in accordance with the invention.

Fig. 2 is a longitudinal sectional view of the same, the section being taken along the line 2—2 of Fig. 1, looking in the direction of the arrows.

Fig. 3 is a side view of the shears in closed position.

Fig. 4 is a sectional view similar to Fig. 2 of one shear member showing the weld-preventing strip in position.

In the manufacture of high grade shears, it has been customary to form the cutting edges of hardened steel strips which were welded or otherwise secured to the inner surfaces of the shear members. Ordinarily the hardened strips extended only from the tip of the shear member to the pivot point, and it has been found in practice that a considerable amount of wear occurred at the rubbing surfaces of the relatively soft metal behind the pivot pin, thereby causing said surfaces to wear away quite rapidly and the shears to become loose.

It has also been customary in high grade shears to provide tensioning means for pressing the blades together at all times.

One difficulty of the former types of tension shears lay in the fact that the tension was variable and not uniform throughout the cutting stroke, causing the shears to be jerky in operation. Moreover, in view of the complicated nature of former types of tension shears, they were quite expensive to manufacture. Again, the springs employed in such shears were likely to rapidly wear off at their rubbing surfaces causing the tension to be impaired, and requiring frequent adjustment.

By means of the present invention, the above and other disadvantages have been avoided, and a form of shears has been provided having a minimum number of parts, which will not loosen even after long continued wear, in which the spring tension will be uniform throughout the cutting stroke and with not diminish with use. This has been accomplished by extending the wearing strip of hardened steel beyond the pivot and in bending up the extending portions of the strip in such a manner that they will press against each other resiliently and form springs for tensioning the shear members.

Referring now to the drawings in which like reference numerals denote corresponding parts throughout the several views, the present invention comprises a pair of shear members 10 and 11, said members having sharp points 12 and 13, and being connected together by a pair of telescoping headed pivot members 14 and 15. The pivot member 14 is preferably made of hardened metal and is provided with a tubular shank 16 for surrounding a solid shank 17 of the pivot member 15, said member 15 preferably being made of soft metal, said tubular shank 16 and said solid shank 17 being held together by a tight friction fit.

Each of the shear members 10 and 11 consists of a relatively thick supporting back or bow 18, preferably constructed of soft malleable iron, and a thin wearing strip or blade 19 preferably made of hardened steel.

The shear members 10 and 11 are provided with the usual finger sections 20 and 21, respectively.

In the process of manufacturing one of the shear members 10 and 11, the thin blade or strip 19 is first laid upon the supporting back or bow 18. A short separating strip 18ᵃ preferably of mica or brown paper or other suitable non-metallic material is then inserted between the strip 19 and the bow 18 at the section from the pivot hole to the rear end. This separating strip is for the purpose of preventing the welding of the metal at this section when the shear member is later heated up and drop-forged.

The shear member is next heated to a welding temperature and drop-forged to unite the strip 19 to the bow 18 from the tip 12 to the pivot hole. The loose ends 22 of the strips 19 will next be bent inwardly into the shape of an arc so that they will press against each other resiliently and tension the shear members during the cutting stroke. The shear member will then be properly heat-treated to enable the blade 19 to retain a durable cutting edge when it is sharpened.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. The process of making a shear member for a pair of tension shears, which comprises placing a thin blade of steel upon a supporting shear bow, inserting a separating strip of non-metallic material between the portion of said blade and bow extending from the pivot point to the inner end of said blade, heating said parts to a welding temperature and forcing said blade and bow together under pressure.

2. The process of making a shear member for a pair of tension shears, which comprises placing a thin blade of steel upon a supporting shear bow, inserting a separating strip of mica between the portion of said blade and bow extending from the pivot point to the inner end of said blade, heating said parts to a welding temperature, and forcing said blade and bow together under pressure.

In testimony whereof, we have affixed our signatures to this specification.

WILLARD A. ISBELL.
HENRY H. CANFIELD.